United States Patent
Choi et al.

(10) Patent No.: US 9,266,526 B2
(45) Date of Patent: Feb. 23, 2016

(54) HYBRID VEHICLE AND CONTROL METHOD FOR THE SAME

(71) Applicants: Hyundai Motor Company, Seoul (KR); Kia Motors Corporation, Seoul (KR)

(72) Inventors: Namil Choi, Gyeonggi-Do (KR); Joon Young Park, Seoul (KR); Kwonchae Chung, Seoul (KR); Jongbum Oh, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/535,985

(22) Filed: Nov. 7, 2014

(65) Prior Publication Data
US 2015/0134173 A1 May 14, 2015

(30) Foreign Application Priority Data
Nov. 8, 2013 (KR) .................. 10-2013-0135394

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |
| B60W 10/02 | (2006.01) |
| B60W 10/06 | (2006.01) |
| B60W 10/10 | (2012.01) |
| B60W 10/08 | (2006.01) |

(52) U.S. Cl.
CPC ............... *B60W 20/00* (2013.01); *B60W 10/02* (2013.01); *B60W 10/06* (2013.01); *B60W 10/08* (2013.01); *B60W 10/10* (2013.01); *Y10S 903/93* (2013.01)

(58) Field of Classification Search
CPC ..... B60W 20/00; B60W 10/02; B60W 10/10; B60W 10/08; B60W 10/06
USPC ............................................. 701/22
See application file for complete search history.

(56) References Cited

U.S. PATENT DOCUMENTS

2012/0053768 A1* 3/2012 Jeon .................. 701/22

FOREIGN PATENT DOCUMENTS

| | | |
|---|---|---|
| JP | 2006-315484 | 11/2006 |
| KR | 10-2012-0062340 | 6/2012 |
| KR | 10-2012-0068241 | 6/2012 |

* cited by examiner

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A control method of a hybrid vehicle is provided and includes determining whether a current vehicle driving mode is an EV mode, whether a current vehicle driving state satisfies a kick-down shift condition, and whether the current vehicle driving state satisfies a driving mode conversion condition for conversion into an HEV mode. The engine is started when the kick-down shift and the driving mode conversion conditions are satisfied. A current motor speed and discharging power of the battery are measured. The measured motor speed and predetermined motor reference speed are compared based on discharging power of the battery. A transmission input shaft target speed for the kick-down shift is calculated and compared to a predetermined transmission input shaft target reference speed based on discharging power of the battery. A control order is determined based on the comparisons and the kick-down shift and the engagement of the engine clutch are performed.

15 Claims, 6 Drawing Sheets

HYBRID VEHICLE AND CONTROL METHOD FOR THE SAME

CROSS-REFERENCE TO RELATED APPLICATION

This application claims priority to and the benefit of Korean Patent Application No. 10-2013-0135394 filed in the Korean Intellectual Property Office on Nov. 8, 2013, the entire contents of which are incorporated herein by reference.

BACKGROUND (a) Field of the Invention

The present invention relates to a hybrid vehicle and a control method for the hybrid vehicle. More particularly, the present invention relates to a hybrid vehicle and a control method for the same, for controlling kick-down shift and engine clutch engagement based on discharging power of a battery when the kick-down shift and the engine clutch engagement are required.

(b) Description of the Related Art

Recently, electric vehicles and hybrid vehicles have been developed for enhancement of fuel consumption of vehicles. An electric vehicle refers to a vehicle in which driving torque is generated by a motor and a hybrid vehicle refers to a vehicle in which driving torque is generated by an engine and a motor. A hybrid vehicle is driven in various modes (e.g., an electric mode, a hybrid mode, an engine mode, etc.) according to a driving condition thereof. The electric mode is a mode for generating driving torque by a motor, the hybrid mode is a mode for generating driving torque by a motor and an engine, and the engine mode is a mode for generating driving torque by an engine.

A transmission mounted electric device hybrid electric vehicle (TMED HEV) formed by attaching a motor to a transmission and inserting a wet clutch (engine clutch) between the transmission and an engine may implement an electric vehicle (EV) mode and a hybrid electric vehicle (HEV) mode via engagement and release of the engine clutch. In the TMED system, a mode is converted to an HEV mode from an EV mode to feel acceleration based on user intention, and in this case, engine power is used as driving torque of a vehicle in the HEV mode. Appropriate connection control of an engine clutch is an important factor to achieve oscillation and acceleration of TMED HEV. Accordingly, when the control is insufficient, a driver may feel a delay in acceleration response and driving directivity may be reduced.

The above information disclosed in this section is merely for enhancement of understanding of the background of the invention and therefore it may contain information that does not form the prior art that is already known in this country to a person of ordinary skill in the art.

SUMMARY

The present invention provides a hybrid vehicle and a control method for the same having advantages of determining a control order of kick-down shift and engine clutch engagement and controlling the kick-down shift and the engine clutch engagement in the determined order when the kick-down shift and the engine clutch engagement are required.

An exemplary embodiment of the present invention provides a hybrid vehicle that may include an automatic transmission, a motor connected to the automatic transmission, an engine, an engine clutch for selectively connecting the motor and the engine, a battery configured to supply power to the motor, an accelerator pedal sensor, a motor speed sensor, a vehicle speed sensor, a memory configured to store motor reference speed based on battery discharging power and transmission input shaft target reference speed based on battery discharging power, an engine speed sensor, and a controller configured to receive corresponding output signals from the accelerator pedal sensor, the motor speed sensor, the vehicle speed sensor, and the engine speed sensor, respectively.

In addition, the controller may be configured to receive a discharging power signal of the battery, and operate the automatic transmission, the motor, the engine, and the engine clutch, wherein, in response to determining that a current driving mode of the vehicle is an EV mode, that kick-down shift is required based on a signal of the accelerator pedal sensor, and a signal of the vehicle speed sensor and a current gear stage of gear shift, and that the driving mode of the vehicle needs to be converted into an HEV mode. The controller may also be configured to start the engine, compare current motor speed and the motor reference speed based on discharging power of the battery, calculate transmission input shaft target speed based on the kick-down, compare the transmission input shaft target speed based on the kick-down with the transmission input shaft target reference speed based on the battery discharging power, determine a control order of the kick-down shift and engagement of the engine clutch, and operate the motor, the engine, the automatic transmission, and the engine clutch in the control order.

The controller may further be configured to operate the engine clutch to first engage the engine clutch and then operate the automatic transmission to perform the kick-down shift when current motor speed is greater than the motor reference speed based on discharging power of the battery or the transmission input shaft target speed based on the kick-down is greater than the transmission input shaft target reference speed based on the battery discharging power.

The engine clutch may be engaged after the controller synchronizes speed of the engine with speed of the motor. The controller may be configured to operate the automatic transmission to perform the kick-down shift and then operate the engine clutch to engage the engine clutch when current motor speed is less than the motor reference speed based on discharging power of the battery and the transmission input shaft target speed based on the kick-down is less than the transmission input shaft target reference speed based on the battery discharging power. The engine clutch may be engaged after the controller adjusts the speed of the engine to the transmission input shaft target speed and completes the kick-down shift.

Another exemplary embodiment of the present invention provides a control method of a hybrid vehicle that includes a motor connected to an automatic transmission, an engine selectively connected to the motor and an engine clutch, and a battery configured to supply power to the motor. The method may include determining whether a current vehicle driving mode is an EV mode for driving the vehicle by the motor, whether a current vehicle driving state satisfies a kick-down shift condition, and whether the current vehicle driving state satisfies a driving mode conversion condition for conversion into an HEV mode for driving the vehicle by the motor and the engine.

Further, the method may include starting the engine when the kick-down shift condition and the driving mode conversion condition are satisfied, measuring current motor speed, measuring discharging power of the battery, comparing the measured motor speed and predetermined motor reference speed based on discharging power of the battery, calculating transmission input shaft target speed for the kick-down shift, and comparing the calculated transmission input shaft target speed and predetermined transmission input shaft target reference speed based on discharging power of the battery, and determining a control order of the kick-down shift and engagement of the engine clutch according to the first comparison and the second comparison and performing the kick-down shift and the engagement of the engine clutch.

The engagement of the engine clutch may be performed and then the kick-down shift may be performed when the motor speed measured in the first comparison is greater than the predetermined motor reference speed based on discharging power of the battery or the transmission input shaft target speed calculated in the second comparison is greater than predetermined transmission input shaft target reference speed based on discharging power of the battery. The engagement of the engine clutch and the kick-down shift may be performed by inhibiting shift of the automatic transmission, synchronizing speed of the engine with speed of the motor, completing engagement of the engine clutch and then performing the kick-down shift.

The kick-down shift may be performed and then the engagement of the engine clutch may be performed when the motor speed measured in the first comparison is less than predetermined motor reference speed based on discharging power of the battery and the transmission input shaft target speed calculated in the second comparison is less than predetermined transmission input shaft target reference speed based on discharging power of the battery. The engagement of the engine clutch and the kick-down shift may be performed by starting the kick-down shift, adjusting speed of the engine to the transmission input shaft target speed, completing the kick-down shift and then engaging the engine clutch.

In a hybrid vehicle and a control method for the same according to an exemplary embodiment of the present invention, when kick-down shift and engine clutch engagement are required, a control order of the kick-down shift and the engine clutch engagement may be determined according to discharging power of a battery and the kick-down shift and the engine clutch engagement may be executed according to the determined order.

BRIEF DESCRIPTION OF THE DRAWINGS

The above and other objects, features and advantages of the present invention will be more clearly understood from the following detailed description taken in conjunction with the accompanying drawing.

DESCRIPTION OF SYMBOLS

Figure 1:
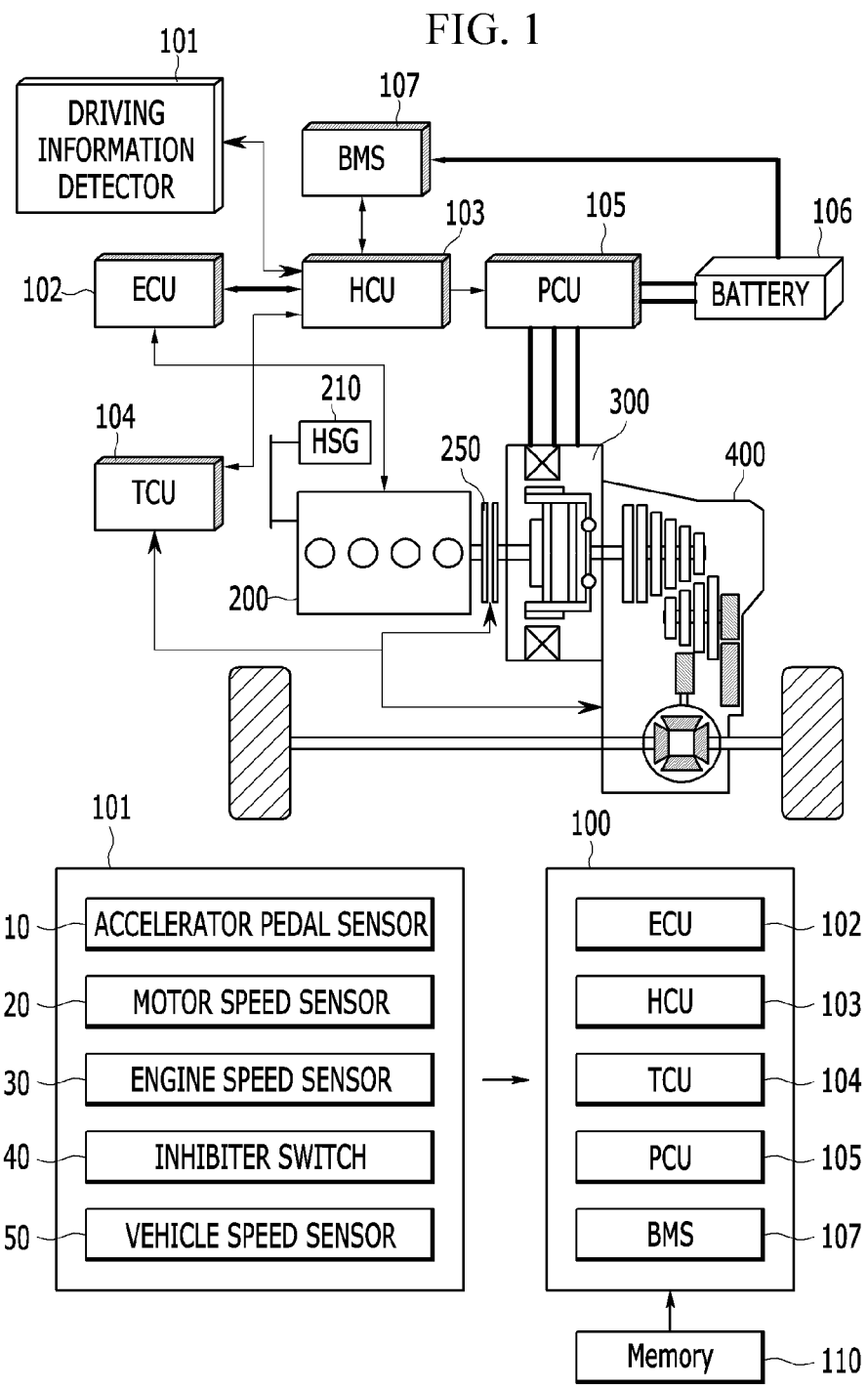
FIG. 1 is an exemplary diagram illustrating a structure of a hybrid vehicle according to an exemplary embodiment of the present invention.

10: accelerator pedal sensor
20: motor speed sensor
30: engine speed sensor
40: inhibiter switch
100: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Throughout this specification, like reference numerals in the drawings denote like elements.

An exemplary embodiment of the present invention will hereinafter be described in detail with reference to the accompanying drawings. FIG. 1 is an exemplary diagram illustrating a structure of a hybrid vehicle according to an exemplary embodiment of the present invention. Referring to FIG. 1, the hybrid vehicle may include a driving information detector 101, an engine control unit (ECU) 102, a hybrid control unit (HCU) 103, a transmission control unit (TCU) 104, a power control unit (PCU) 105, a battery 106, a battery management system (BMS) 107, an engine 200, a hybrid starter and generator (HSG) 210, an engine clutch 250, a motor 300, and an automatic transmission 400. A controller may be configured to execute the driving information detector 101, the ECU 102, the HCU 103, the TCU 104, the PCU 105, the battery 106, the BMS 107, the engine 200, the HSG 210, the engine clutch 250, the motor 300, and the automatic transmission 400.

The automatic transmission 400 applied to the hybrid vehicle according to an exemplary embodiment of the present invention may be a continuous variable transmission (CVT), a dual clutch transmission (DCT) and on the like as well as a general automatic transmission which includes a torque converter, a plurality of clutches, a plurality of brakes and on the like. The driving information detector 101 may include an accelerator pedal sensor 10, a motor speed sensor 20, an engine speed sensor 30, an inhibiter switch 40, and a vehicle speed sensor 50 and may be configured to detect a corresponding output signal to provide the output signal to the HCU 104 via a network.

The ECU 102 may be configured to operate the engine 200 in conjunction with the HCU 103 connected to the network and provide operation state information of the engine 200 to the HCU 103. The HCU 103 may be an uppermost controller which may be configured to integrally operate lower controllers connected to the network, and collect and analyze information regarding each lower controller to operate the hybrid vehicle. The TCU 104 may be configured to execute power delivery of the engine 200 by operating the transmission 400 based on a control signal from the HCU 103 connected to the network to perform gear change to a target gear and perform engagement and release (e.g., disengagement) of the engine clutch 250. The PCU 105 may include an inverter and a protection circuit, which may include a motor control unit (MCU) and a plurality of power switching devices, and may be configured to convert a direct current (DC) voltage applied from the battery 106 into a three-phase alternating current (AC) voltage to drive the motor 300 based on a control signal from the HCU 103.

Each power switching device included in the PCU 105 may be composed of any one of an insulated gate bipolar transistor (IGBT), a MOSFET, a transistor, and a relay. The battery 106 may be configured to supply power to the motor 300 to facilitate output of the engine 200 in an HEV mode and charge a voltage generated according to regenerative braking control. In addition, the battery 106 may be configured to supply driving power to the motor 300 to drive the vehicle in the EV mode. The BMS 107 may be configured to detect overall information such as the voltage, current, temperature, etc. of the battery 106, manage a charging state, and adjust the charging and discharging current amount of the battery 106 to prevent over-discharge with a limited voltage or less or overcharge with a limited voltage or greater. The HSG 210 may be configured to execute idle stop and restart of the engine 200 based on a driving state of the vehicle.

The hybrid vehicle according to an exemplary embodiment of the present invention may include the memory 110 configured to store motor reference speed based on battery discharging power and transmission input shaft target reference speed based on battery discharging power. According to an exemplary embodiment of the present invention, unless explicitly described to the contrary, the ECU 102, the HCU 103, the TCU 104, the PCU 105, and the BMS 107 are referred to as the controller 100. The controller 100 may be configured to receive corresponding output signals from the accelerator pedal sensor 10, the motor speed sensor 20, the engine speed sensor 30, and the vehicle speed sensor 50, respectively, receive a discharging power signal of the battery, and operate the automatic transmission, the motor 300, the engine 200, and the engine clutch 250.

Upon determining that a current driving mode of the vehicle is an EV mode, that kick-down shift is required based on a signal of the accelerator pedal sensor, and a signal of the vehicle speed sensor and a current gear stage of gear shift, and that the driving mode of the vehicle needs to be converted into an HEV mode, the controller may be configured to start the engine, compare current motor speed and the motor reference speed based on discharging power of the battery, calculate transmission input shaft target speed based on the kick-down, compare the transmission input shaft target speed based on the kick-down with the transmission input shaft target reference speed based on the battery discharging power, determine a control order of the kick-down shift and engagement of the engine clutch, and operate the motor, the engine, the automatic transmission, and the engine clutch in the control order.

Figure 2:
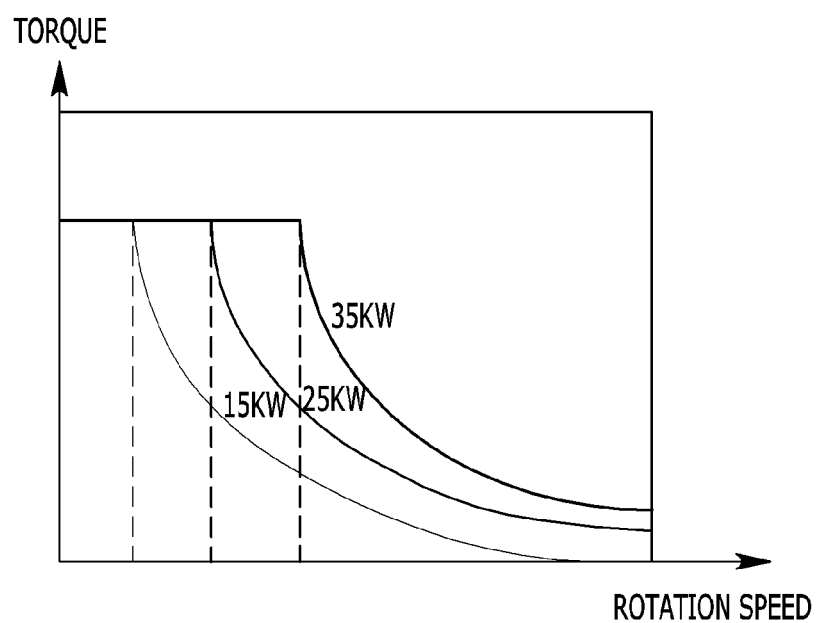
FIG. 2 is an exemplary graph illustrating a relation between motor torque and rotation speed according to battery discharging power according to an exemplary embodiment of the present invention.

FIG. 2 is an exemplary graph illustrating a relation between motor torque and rotation speed according to battery discharging power. Referring to FIG. 2, in general, motor torque may be output as maximum motor torque up to predetermined rotation speed but may be significantly decreased when the rotation speed is greater than a predetermined range. In addition, motor rotation speed for outputting maximum motor torque may decrease along with reduction in battery discharging power.

Accordingly, maximum driving torque may vary according to battery discharging power in an EV mode and thus, when kick-down shift and conversion of a vehicle driving mode into an HEV mode are required, a control order may be determined. In other words, when engagement and shift overlap within rotation speed at which a motor generates maximum torque, pre-shift and post-engagement for rapid responsiveness is advantageous, and when pre-engagement and post-shift for achieving substantially high engine driving torque via engagement is advantageous in the other range.

Figure 3:
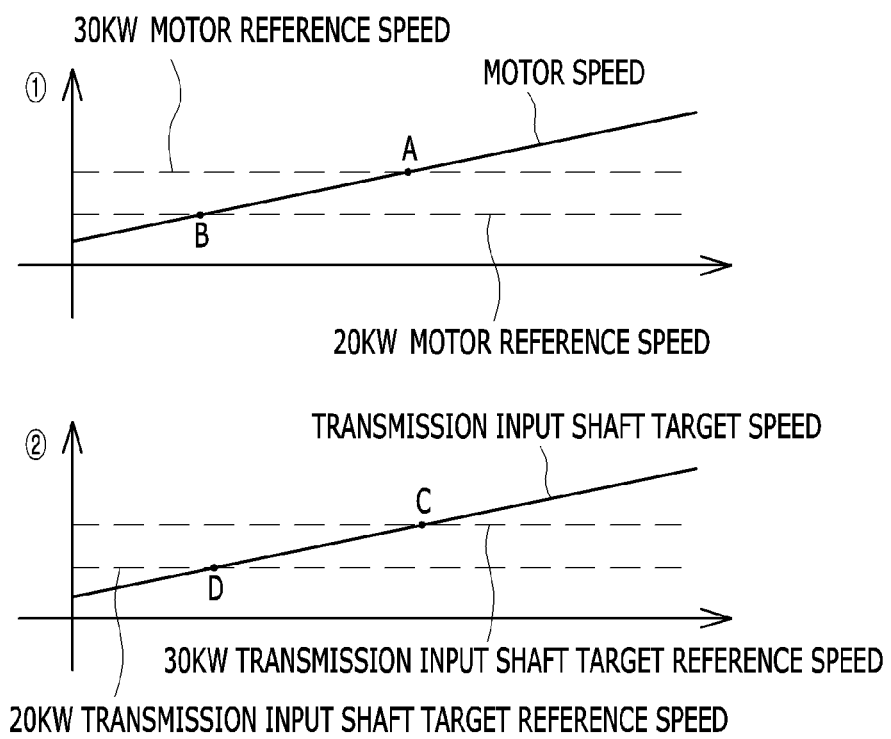
FIG. 3 is an exemplary graph of transmission input shaft target speed and motor speed to determination of control order of a control method of a hybrid vehicle according to an exemplary embodiment of the present invention.
Figure 4:
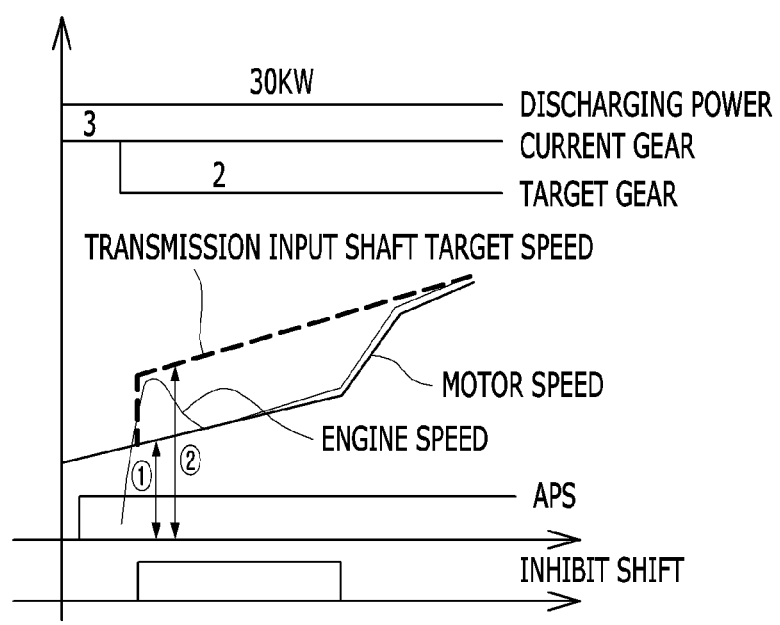
FIG. 4 is an exemplary graph a control method of pre-engagement and post-shift of a control method of a hybrid vehicle according to an exemplary embodiment of the present invention.

FIG. 3 is an exemplary graph of transmission input shaft target speed and motor speed, applied to determination of control order of a control method of a hybrid vehicle according to an exemplary embodiment of the present invention, and FIG. 4 is an exemplary graph for explanation of a control method of pre-engagement and post-shift of a control method of a hybrid vehicle according to an exemplary embodiment of the present invention.

Referring to FIG. 4, for example, assuming that a current operating mode of the vehicle is an EV mode, current discharging power of the battery 106 is about 30 Kw, a current gear stage is a third stage, kick-down shift is required according to an output signal of the accelerator pedal sensor 10, and the operating mode of the vehicle needs to be converted into an HEV mode, the controller 100 may be configured to start the engine 200. In addition, the controller 100 may be configured to measure speed of the motor 300 and calculate transmission input shaft target speed of a kick-down target gear stage. For example, the controller 100 may be configured to determine a kick-down target gear stage based on signals of the accelerator pedal sensor 10, the inhibiter switch 40, and vehicle speed sensor 50 and calculate transmission input shaft target speed according to the target gear stage. In particular, the determined target gear stage may be assumed to be a first stage.

Further, the controller 100 may be configured to obtain information regarding motor reference speed based on the battery discharging power and information of transmission input shaft target reference speed based on battery discharging power from the memory 110 and compare motor reference speed based on the battery discharging power and the transmission input shaft target reference speed based on battery discharging power with the motor speed and the transmission input shaft target speed, respectively. In particular, the motor reference speed based on the battery discharging power may reflect maximum torque curved line of a motor according to discharging power and the transmission input shaft target reference speed based on the battery discharging power may reflect a variation ratio between a current gear stage and a target gear stage.

When the motor speed is greater than motor reference speed based on discharging power (e.g., about 30 Kw) of the battery, that is, when the motor speed is greater than speed A of FIG. 3, the controller may be configured to determine a state in which torque is insufficient due to the current torque of the motor 300 being greater than maximum torque speed (rotation speed). In addition, when the transmission input shaft target speed (e.g., first stage) is greater than the transmission input shaft target reference speed based on battery discharging power (e.g., about 30 Kw), that is, when the transmission input shaft target speed is greater than speed C of FIG. 3, the controller may be configured to determine a state in which engine torque is to be used due to an increase in motor speed to decrease maximum torque of the motor during the gear shift.

Accordingly, when the current motor speed is greater than speed A or the transmission input shaft target speed is greater than speed C, the engine clutch 250 may first be engaged and then kick-down shift may be performed. In addition, when current battery discharging power is about 20 Kw and when current motor speed is greater than speed B or the transmission input shaft target speed is greater than speed D, the engine clutch 250 may first be engaged and then kick-down shift may be performed.

Figure 5:
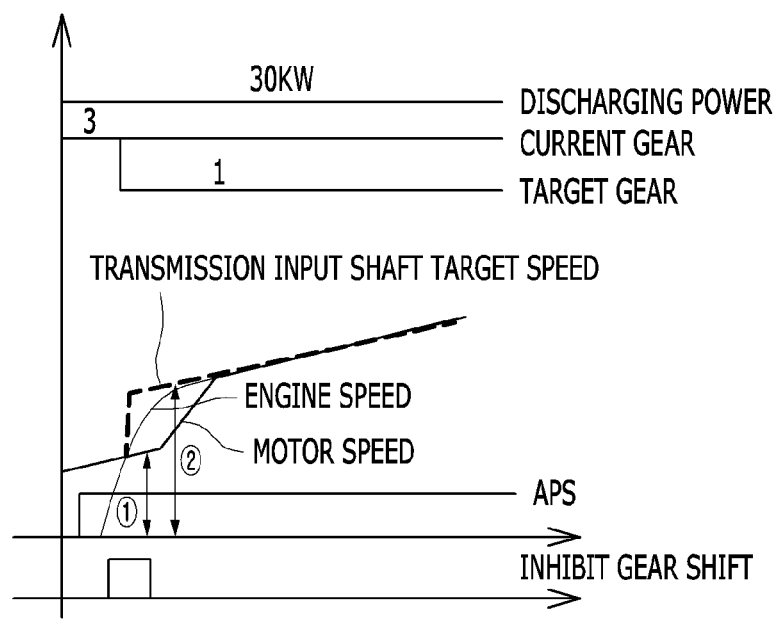
FIG. 5 is an exemplary graph for explanation of a control method of pre-shift and post-engagement of a control method of a hybrid vehicle according to an exemplary embodiment of the present invention.

FIG. 5 is an exemplary graph of a control method of pre-shift and post-engagement of a control method of a hybrid vehicle according to an exemplary embodiment of the present invention. It may be assumed that the control method of pre-shift and post-engagement that will be described with reference to FIG. 5 has the same condition as the condition described with reference to FIG. 4 and a determined target gear stage is a second stage.

When the motor speed is less than motor reference speed according to discharging power (e.g., about 30 Kw) of the battery, that is, when the motor speed is less than speed A of FIG. 3, the controller may be configured to determine a state in which torque is sufficient due to a current torque of the motor 300 being less than maximum torque speed (rotation speed).

In addition, when the transmission input shaft target speed (e.g., second stage) is less than the transmission input shaft target reference speed based on battery discharging power (e.g., about 30 Kw), that is, when the transmission input shaft target speed is less than speed C of FIG. 3, the controller may be configured to determine a state in which gear shift is capable of being performed even when the motor speed increases to reduce maximum torque of the motor during the gear shift. Accordingly, when the current motor speed is less than speed A and the transmission input shaft target speed is less than speed C, the kick-down shift may first be performed and then the engine clutch 250 may be engaged. In addition, when current battery discharging power is about 20 Kw and when current motor speed is less than speed B and the transmission input shaft target speed is less than speed D, the kick-down shift may first be performed and then the engine clutch 250 may be engaged.

Figure 6:
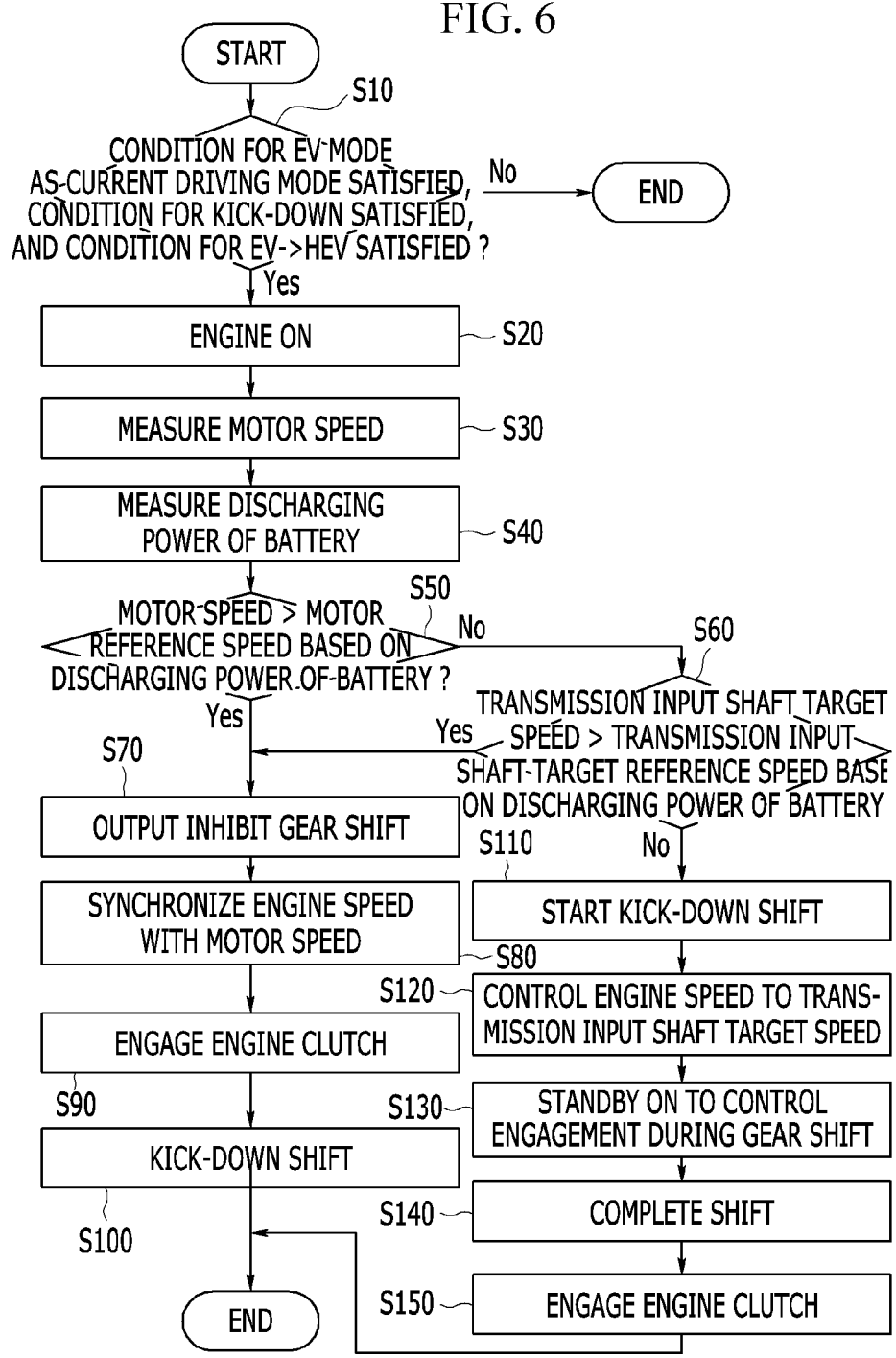
FIG. 6 is an exemplary flowchart of a control method of a hybrid vehicle according to an exemplary embodiment of the present invention.

FIG. 6 is an exemplary flowchart of a control method of a hybrid vehicle according to an exemplary embodiment of the present invention. Hereinafter, with reference to FIGS. 1 to 6, a control method of a hybrid vehicle according to an exemplary embodiment of the present invention will be described.

The controller 100 may be configured to determine whether a current vehicle driving mode is an EV mode for driving the vehicle by the motor 300, whether a current vehicle driving state satisfies a kick-down shift condition, and whether the current vehicle driving state satisfies a driving mode conversion condition for conversion into an HEV mode for driving the vehicle by the motor 300 and the engine 200 (S10). The controller 100 may further be configured to determine whether the kick-down shift and the conversion into an HEV mode are performed according to a predetermined map based on signals of the accelerator pedal sensor 10, the inhibiter switch 40, and vehicle speed sensor 50.

When the kick-down shift condition and the driving mode conversion condition are satisfied, the controller 100 may be configured to start the engine 200 (S20). In addition, the controller 100 may be configured to measure the current motor speed (S30) and measure discharging power of the battery (S40). The controller 100 may be configured to first compare (e.g., a first comparison) the measured motor speed and predetermined motor reference speed based on discharging power of the battery (S50). The controller 100 may then be configured to secondly calculate transmission input shaft target speed for the kick-down shift and compare the calculated transmission input shaft target speed and the predetermined transmission input shaft target reference speed based on discharging power of the battery (a second comparison) (S60).

In addition, the controller 100 may be configured to determine a control order of the kick-down shift and engagement of the engine clutch according to the first comparison and the second comparison and performs the kick-down shift and engagement of the engine clutch. When the motor speed measured in the first comparison is greater than the predetermined motor reference speed according to discharging power of the battery or the transmission input shaft target speed calculated in the second comparison is greater than the predetermined transmission input shaft target reference speed according to discharging power of the battery, the controller 100 may be configured to first perform engagement of the engine clutch 250 and then perform the kick-down shift.

As shown in FIG. 4, the engagement of the engine clutch and the kick-down shift may be performed by inhibiting gear shift of the automatic transmission 400 by the controller 100 (S70), synchronizing speed of the engine 200 with speed of the motor 300 (S80), completing engagement of the engine clutch 250 (S90) and then performing the kick-down shift (S100).

When the motor speed measured in the first comparison is less than the predetermined motor reference speed based on discharging power of the battery and the transmission input shaft target speed calculated in the second comparison is less than the predetermined transmission input shaft target reference speed according to the discharging power of the battery, the controller 100 may be configured to the kick-down shift and then perform engagement of the engine clutch.

As shown in FIG. 3, the engagement of the engine clutch and the kick-down shift may be performed by operating the automatic transmission 400 of the controller 100 to start the kick-down shift (S110), adjusting speed of the engine 200 to the transmission input shaft target speed (S120), operating in a standby mode to execute engagement during gear shift (S130), completing the kick-down shift (S140) and then performing engagement of the engine clutch 250 (S150).

In a hybrid vehicle and a control method for the same according to an exemplary embodiment of the present invention, when kick-down shift and engine clutch engagement are required, a control order of the kick-down shift and the engine clutch engagement may be determined according to discharging power of a battery and the kick-down shift and the engine clutch engagement may be executed according to the determined order. Accordingly, current output torque of a motor and outputtable torque during gear shift of the motor may be reflected and kick-down shift and engine clutch engagement may be performed and thus acceleration responsiveness and driving directivity may be maintained.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A hybrid vehicle comprising:
   an automatic transmission;
   a motor connected to the automatic transmission;
   an engine;
   an engine clutch for selectively connecting the motor and the engine to each other;
   a battery configured to supply power to the motor;
   an accelerator pedal sensor;
   a motor speed sensor;
   a vehicle speed sensor;
   a memory configured to store a motor reference speed based on battery discharging power and a transmission input shaft target reference speed based on battery discharging power;
   an engine speed sensor; and
   a controller configured to:
   receive corresponding output signals from the accelerator pedal sensor, the motor speed sensor, the vehicle speed sensor, and the engine speed sensor, respectively;
   receive a discharging power signal of the battery; and
   operate the automatic transmission, the motor, the engine, and the engine clutch,
   wherein, upon determining that a current driving mode of the vehicle is an electric vehicle (EV) mode, that kick-down shift is required based on a signal of the accelerator pedal sensor, and a signal of the vehicle speed sensor and a current gear stage of gear shift, and that the driving mode of the vehicle needs to be converted into a hybrid electric vehicle (HEV) mode, the controller is further configured to:
   start the engine;
   compare current motor speed and the motor reference speed based on discharging power of the battery;
   calculate transmission input shaft target speed based on the kick-down;
   compare the transmission input shaft target speed based on the kick-down with the transmission input shaft target reference speed based on the battery discharging power;
   determine a control order of the kick-down shift and engagement of the engine clutch; and
   operate the motor, the engine, the automatic transmission, and the engine clutch in the control order.

2. The vehicle of claim 1, wherein the controller is configured operate the engine clutch to first engage the engine clutch and then operate the automatic transmission to perform the kick-down shift when current motor speed is greater than the motor reference speed based on discharging power of the battery or the transmission input shaft target speed based on the kick-down is greater than the transmission input shaft target reference speed based on the battery discharging power.

3. The vehicle of claim 2, wherein the engine clutch is engaged after the controller synchronizes speed of the engine with speed of the motor.

4. The vehicle of claim 1, wherein the controller is configured to operate the automatic transmission to perform the kick-down shift and then operate the engine clutch to engage the engine clutch when current motor speed is less than the motor reference speed based on discharging power of the battery and the transmission input shaft target speed based on the kick-down is less than the transmission input shaft target reference speed based on the battery discharging power.

5. The vehicle of claim 4, wherein the engine clutch is engaged after the controller adjusts a speed of the engine to the transmission input shaft target speed and completes the kick-down shift.

6. A control method of a hybrid vehicle that includes a motor connected to an automatic transmission, an engine selectively connected to the motor and an engine clutch, and a battery configured to supply power to the motor, the method comprising:
   determining, by a controller, whether a current vehicle driving mode is an electric vehicle (EV) mode for driving the vehicle by the motor, whether a current vehicle driving state satisfies a kick-down shift condition, and whether the current vehicle driving state satisfies a driving mode conversion condition for conversion into a hybrid electric vehicle (HEV) mode for driving the vehicle by the motor and the engine;
   starting, by the controller, the engine when the kick-down shift condition and the driving mode conversion condition are satisfied;
   measuring, by the controller, current motor speed;
   measuring, by the controller, discharging power of the battery;
   comparing, by the controller, the measured motor speed and predetermined motor reference speed based on discharging power of the battery;
   calculating, by the controller, transmission input shaft target speed for kick-down shift and comparing the calculated transmission input shaft target speed and predetermined transmission input shaft target reference speed based on discharging power of the battery; and determining, by the controller, a control order of the kick-down shift and engagement of the engine clutch according to the first comparison and the second comparison and performing the kick-down shift and the engagement of the engine clutch.

7. The method of claim 6, wherein the engagement of the engine clutch is first performed and then the kick-down shift is performed when the motor speed measured in the first comparison is greater than the predetermined motor reference speed based on discharging power of the battery or the transmission input shaft target speed calculated in the second comparison is greater than the predetermined transmission input shaft target reference speed based on discharging power of the battery.

8. The method of claim 7, wherein the engagement of the engine clutch and the kick-down shift is performed by inhibiting shift of the automatic transmission, synchronizing speed of the engine with speed of the motor, completing the engagement of the engine clutch and then performing the kick-down shift.

9. The method of claim 6, wherein the kick-down shift is performed and then the engagement of the engine clutch is performed when the motor speed measured in the first comparison is less than the predetermined motor reference speed based on discharging power of the battery and the transmission input shaft target speed calculated in the second comparison is less than the predetermined transmission input shaft target reference speed based on discharging power of the battery.

10. The method of claim 9, wherein the engagement of the engine clutch and the kick-down shift are performed by starting the kick-down shift, adjusting speed of the engine to the transmission input shaft target speed, completing the kick-down shift and then engaging the engine clutch.

11. A non-transitory computer readable medium of a hybrid vehicle that includes a motor connected to an automatic transmission, an engine selectively connected to the motor and an engine clutch, and a battery configured to supply power to the motor, containing program instructions executed by a controller, the computer readable medium comprising:

program instructions that determine whether a current vehicle driving mode is an electric vehicle (EV) mode for driving the vehicle by the motor, whether a current vehicle driving state satisfies a kick-down shift condition, and whether the current vehicle driving state satisfies a driving mode conversion condition for conversion into a hybrid electric vehicle (HEV) mode for driving the vehicle by the motor and the engine;

program instructions that start the engine when the kick-down shift condition and the driving mode conversion condition are satisfied;

program instructions that measure current motor speed;

program instructions that measure discharging power of the battery;

program instructions that compare the measured motor speed and predetermined motor reference speed based on discharging power of the battery;

program instructions that calculate transmission input shaft target speed for kick-down shift and compare the calculated transmission input shaft target speed and predetermined transmission input shaft target reference speed based on discharging power of the battery; and program instructions that determine a control order of the kick-down shift and engagement of the engine clutch according to the first comparison and the second comparison and perform the kick-down shift and the engagement of the engine clutch.

12. The non-transitory computer readable medium of claim 11, wherein the engagement of the engine clutch is first performed and then the kick-down shift is performed when the motor speed measured in the first comparison is greater than the predetermined motor reference speed based on discharging power of the battery or the transmission input shaft target speed calculated in the second comparison is greater than the predetermined transmission input shaft target reference speed based on discharging power of the battery.

13. The non-transitory computer readable medium of claim 12, wherein the engagement of the engine clutch and the kick-down shift is performed by inhibiting shift of the automatic transmission, synchronizing speed of the engine with speed of the motor, completing the engagement of the engine clutch and then performing the kick-down shift.

14. The non-transitory computer readable medium of claim 11, wherein the kick-down shift is performed and then the engagement of the engine clutch is performed when the motor speed measured in the first comparison is less than the predetermined motor reference speed based on discharging power of the battery and the transmission input shaft target speed calculated in the second comparison is less than the predetermined transmission input shaft target reference speed based on discharging power of the battery.

15. The non-transitory computer readable medium of claim 11, wherein the engagement of the engine clutch and the kick-down shift are performed by starting the kick-down shift, adjusting speed of the engine to the transmission input shaft target speed, completing the kick-down shift and then engaging the engine clutch.

* * * * *